May 10, 1938.  D. R. SEAMAN  2,116,771
INSULATING UNIT
Filed May 29, 1935

Inventor:
Duncan R. Seaman
By: Lee J. Gary
Attorney

Patented May 10, 1938

2,116,771

UNITED STATES PATENT OFFICE 2,116,771

INSULATING UNIT

Duncan R. Seaman, Detroit, Mich., assignor to Seaman Paper Company, Chicago, Ill., a corporation of Illinois Application May 29, 1935, Serial No. 24,162

2 Claims. (Cl. 154—44)

This invention relates to improvements in insulating panels or board and refers specifically to a panel or board comprising a fibrous material having intrinsic insulating characteristics, the panel or board being so constructed as to have ideal heat, cold and sound insulating properties.

The utility, objects and advantages of my invention will be apparent from the accompanying drawing and following detailed description.

In the drawing, Fig. 1 is a fragmentary side elevational view, partly in section, of an automobile equipped with one form of my insulating board.

Figure 1:
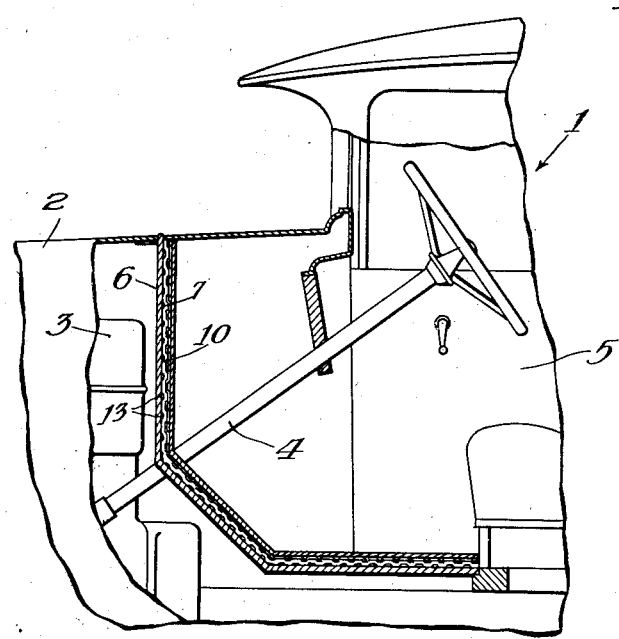

Referring in detail to the drawing, 1 indicates an automobile having hood 2, engine 3, steering apparatus 4 and driver's compartment 5. The engine compartment is separated from the driver's compartment 5 by a partition or dash board 6, which for economy in construction and durability is made of metal. It is well known that metal is a good conductor of heat and also sound. Hence, means is usually provided for insulating said dash board to prevent the passage of heat from the engine to the driver's compartment or vice versa and to dampen sound vibrations.

My invention comprises a board or panel 7 constructed of loosely felted fibrous material, preferably kapok which is a hollow fibre having walls impervious to water and capable of being bulked in low density volume. The sheet or board is provided throughout its area with a plurality of indentations 8 and projections 9 which appear reciprocally on each face of the sheet, that is, an indentation 8 on one sheet is disposed opposite to a projection 9 on the opposite face of the sheet.

Figure 2:
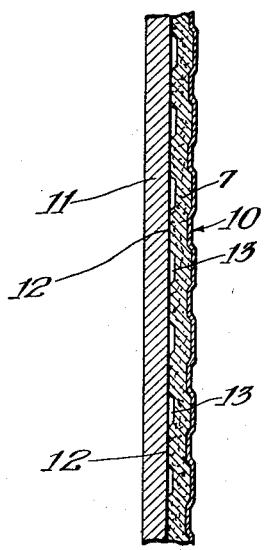
Fig. 2 is a sectional view of the panel or board upon a metal support.

One of the faces of the sheet or board 7 may be coated with asphalt or other waterproofing material, the asphalt or waterproofing film 10 completely covering the indented surface and conforming with the indentations and projections thereon. In utilizing my invention in conjunction with automobiles, the sheet or board 7 is adhesively united to the metal base or support 11 comprising, for instance, the dash 6. Of course, adhesion of the board 7 with the base 11 takes place only at the crests of the projections 9, as indicated at 12 in Fig. 2, providing a plurality of dead air cells 13 between the base 11 and board 7. The adhesive preferably used is rubber cement, but other similar adhesives are also contemplated.

As has been hereinbefore described between each of the ridges or projections there is provided a dead air cell, which in itself is one of the best known methods of heat and cold insulation. In addition, if kapok is used, the body of the sheet or board comprises hollow fibres having minute or board comprises hollow fibres having minute dead air cells and these cells coupled with the dead air spaces between the fibres of the sheet or board, gives said sheet or board unusually high thermal resistance. The cementing of this indented sheet to the metal base 11 also eliminates any possibility of setting up a skin temperature on the metal, which might be absorbed by any convection movement of the air within the automobile itself, because the skin temperature of the asphalt surface 10 is higher than the skin temperature of the metal. Furthermore, insulating materials are only heat resistors as long as they remain free of moisture. Consequently, by the provision of the asphalt or waterproof film 10 on the outside surface of the sheet or board 7 the body of the board is maintained in a substantially dry state and, hence, the insulating properties of the material of the board are maintained substantially constant.

By adhesively uniting the sheet or board 7 to the metal base 11, sound vibrations set up in the metal base by the engine 3 are broken up more or less into small groups, each being confined to its own individual air cell. The sound waves will readily traverse the air space and reach the body of the material where, due to the hollow construction of the fibre and its loosely felted condition, a good portion of the sound effect will be absorbed. However, unless the board is made excessively thick, there will not be sufficient material present to make this absorption complete, and if the asphalt skin or waterproof film 10 were not present these unabsorbed sound waves would pass through the body of the material 7 and then into the automobile itself. However, the sound waves striking the inner surface of the asphalt film, instead of passing through said film, will be reflected back through the fibrous body 7 and a further amount of sound waves will be absorbed, and by the continuance of this bouncing or reflecting action a very high percentage of the sound will be dissipated.

It is well known that if a metal sheet free and unencumbered on both sides is vibrated, sound waves are produced in large quantities and of a wave length equal to the resonant frequency of the sheet. However, by adhesively uniting a board 7 to the metal sheet, the weight factor alone of the added material will materially reduce the resultant sound effect by changing the resonant frequency of the sheet. This effect is that of damping and tends to reduce the period of vibration and the wave length of the sound. In addition, the sound absorbed by any absorbing medium is dependent upon the bulk of the material upon which the sound waves impinge. By providing an indented surface for the sheet or board 7, a much greater surface is exposed to the sound waves and a greater weight of material is thus added to the same unit of area.

Figure 3:
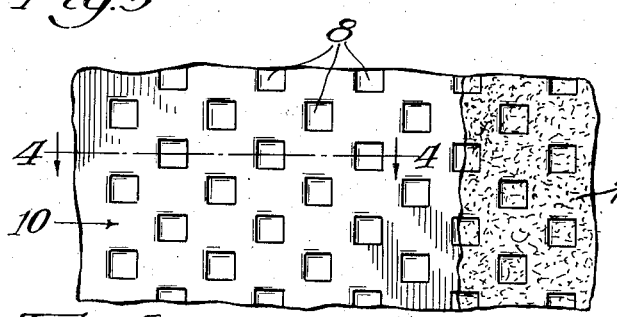
Fig. 3 is a fragmentary top plan view, parts being broken away, of the panel or board per se.
Figure 5:
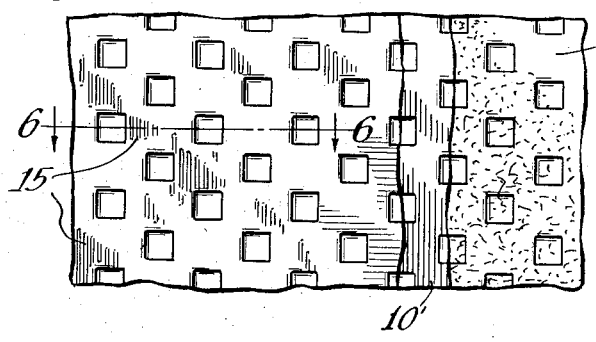
Fig. 5 is a view similar to Fig. 3 illustrating a modification of my invention.
Figure 4:
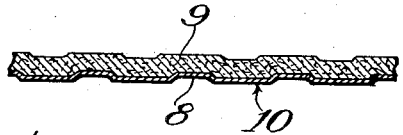
Fig. 4 is a sectional view taken on line 4—4 of Fig. 3.
Figure 6:
Fig. 6 is a sectional view taken on line 6—6 of Fig. 5.

Referring particularly to Figs. 5 and 6, a slight modification of my board is shown. The board 14 is similar in construction to that shown in Figs. 3 and 4, having a body 7' of loosely felted fibrous material preferably kapok and a coating or film of asphalt 10' or other waterproof material. The board 14 may be indented similar to board 7. In this form of my invention the board 14 prior to indenting the same may have united to the asphalt surface thereof a crinkled kraft paper 15 which conforms with the indentations after the board is indented. By using the kraft liner additional structural strength is imparted to the board. By using crinkled paper said liner will not tear or be ruptured during the indenting operation since the paper is more or less resilient. In all other respects board 14 is the same as board 7 and may be used under the same conditions and for the same purposes.

It is to be understood, of course, that I do not wish to limit my invention to use only as an automobile liner, since the same is equally efficacious in other environments, for instance, an insulating building board, refrigerator lining or the like. It is to be further understood that an asphalt or other waterproof coating similar to the film 10 may be applied to both faces of the body 7 or a crinkled sheet 15 together with an asphalt or other waterproof adhesive film 10' may be applied to each face of the body 7'.

I claim as my invention:

1. An insulating board comprising a body of loosely felted fibrous material having a plurality of indentations and projections upon each face thereof, a waterproof coating upon a surface thereof which conforms with said surface, and a fibrous liner adhesively united by said coating to said body, said fibrous liner also conforming with the indentations and projections of said surface, the crests of the opposite surface being adhesively united to a metal base.

2. An insulating board comprising a body of loosely felted fibrous material having a plurality of indentations and projections upon each face thereof, a waterproof coating upon a surface thereof which conforms with said surface, and a crinkled fibrous liner adhesively united by said coating to said body, said liner also conforming with the indentations and projections of said surface, the crests of the opposite surface of said body being adhesively united to a metal base.

DUNCAN R. SEAMAN.